Oct. 27, 1936.  H. P. NORDMARK ET AL  2,058,714

MOTOR DRIVEN TURNTABLE

Filed Feb. 18, 1935  2 Sheets-Sheet 1

Inventors
Donald R. Baker.
Henry P. Nordmark.

Oct. 27, 1936.  H. P. NORDMARK ET AL  2,058,714
MOTOR DRIVEN TURNTABLE
Filed Feb. 18, 1935  2 Sheets-Sheet 2

Witness:  
Geo L Chapel

Inventors  
Donald R. Baker  
Henry P. Nordmark

By Rice and Rice  
Attorneys

Patented Oct. 27, 1936

2,058,714

UNITED STATES PATENT OFFICE 2,058,714

MOTOR DRIVEN TURNTABLE

Henry P. Nordmark, Grand Rapids, Mich., and Donald R. Baker, New York, N. Y., assignors to Kay Displays, Inc., New York, N. Y., a corporation of New York Application February 18, 1935, Serial No. 7,106

2 Claims. (Cl. 172—126)

The instant invention relates to motor driven turntables and more particularly to turntables rotated by means of electric make and break impulse motors.

The primary objects of the present invention are to provide a device of the character above indicated which is particularly well adapted for use in conjunction with animated display advertising; to provide such a device having self-starting mechanism; and, to provide such a device which is sales appealing in use, which is an advertising attraction, and which is both economical in operation and in manufacture.

An illustrative embodiment of the invention is shown in the accompanying drawings, wherein.

Figure 1:
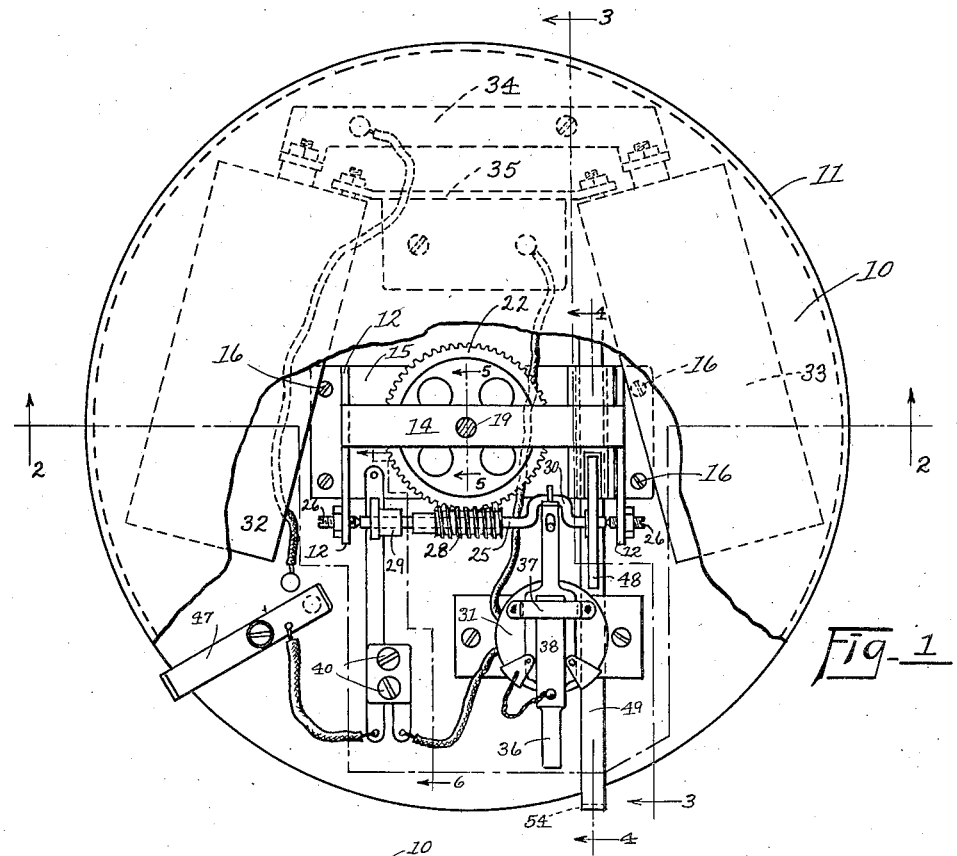
Figure 1 is a top plan view thereof, partly broken away to better show the operating mechanism.
Figure 2:
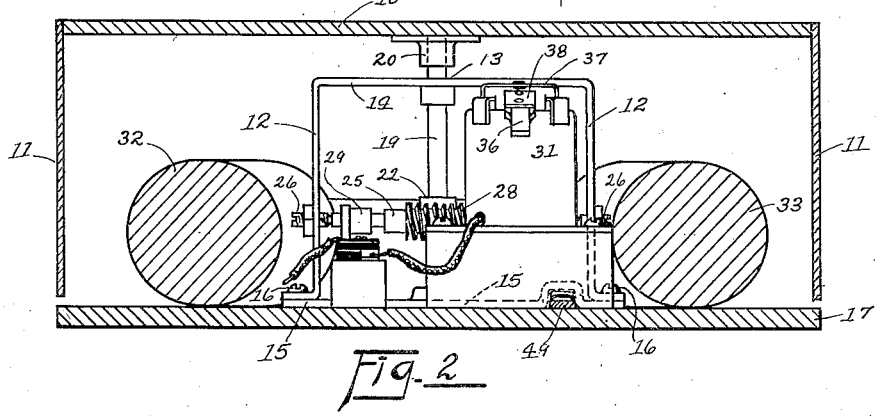
Figure 2 is a sectional view thereof on line 2—2 of Figure 1.

Referring then to the drawings in which like parts of the device shown are designated by the same numerals in the several views, a horizontally disposed turntable 10 of circular form and of any suitable material, is provided with a skirt portion or depending flange 11 for hiding the operating mechanism located below the table.

An inverted U-plate 12 having a journal bearing 13 in its middle portion 14 is secured to a cross plate 15 which is mounted on the base 17 as by the screws 16 and the plate 15 is provided with a bearing well 18.

A vertically disposed driven shaft 19 supported at its lower end in the bearing well 18 and adjacent its upper end within the journal bearing 13 supports a fixedly secured collar 20 to which is secured the horizontally disposed turntable 10. This driven shaft is provided with a gear wheel 22 which is transversely fixed thereto as by the collar 23 and its set screw 24 passing therethrough and engaging the driven shaft 19.

A horizontally disposed driving shaft 25 supported by adjustable tapered bearing pins 26 passing through the spaced vertical supports 12 is provided with gearing, here shown as a worm 28 substantially medially thereof, meshing with the gear wheel 22. On one side of the worm is a cam 29 and on the other side thereof is a crank 30, whose several functions will be presently set forth and described.

Figure 3:
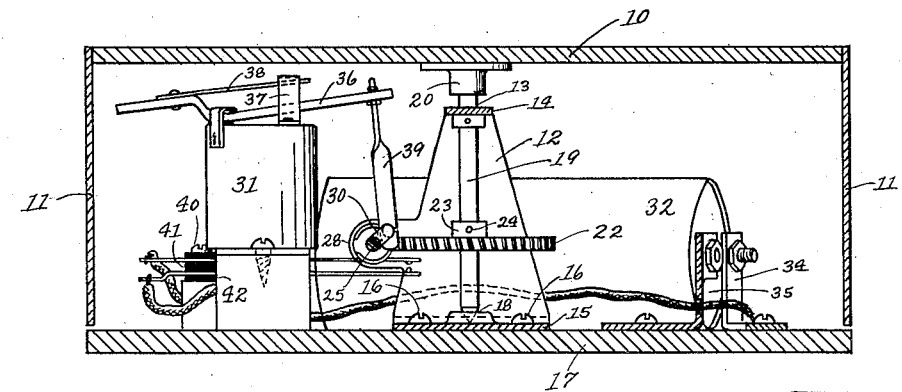
Figure 3 is a sectional view on line 3—3 of Figure 1.

A motor 31 of the make and break impulse type and within an electric circuit connected with a suitable source of electric energy such as the dry cells 32, 33 which are connected together by the conductor plates 34, 35 is vertically mounted upon the base 17. A normally open switch arm 36 is pivotally mounted upon the upper end of the motor and extends beyond both ends thereof, as best shown in Figure 3, and between the yoke 37 whose transverse under surface forms one switch contact for the parallel arm 38 when the switch arm 36 is in the position shown in Figure 3. The switch arm 38 has a depending link 39 pivotally secured to the crank 30.

Secured to the base 17 below the cam 29 as by the screws 40 and spacing blocks 41, 42 are a pair of flexible spaced electrical conducting fingers 43, 44 having contact ends 45, 46 which are normally open but are adapted to be closed by the cam 29 during its rotation with the driving shaft 25. A swingable manually operable master switch 47, likewise within the electric circuit shown, is preferably provided.

Figure 4:
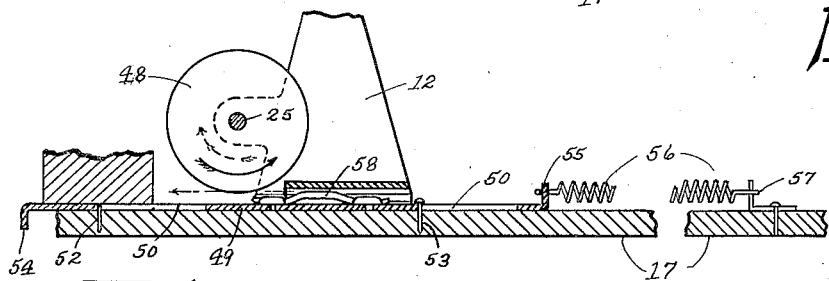
Figure 4 is a sectional view on line 4—4 of Figure 1.
Figures 5, 6, 7:
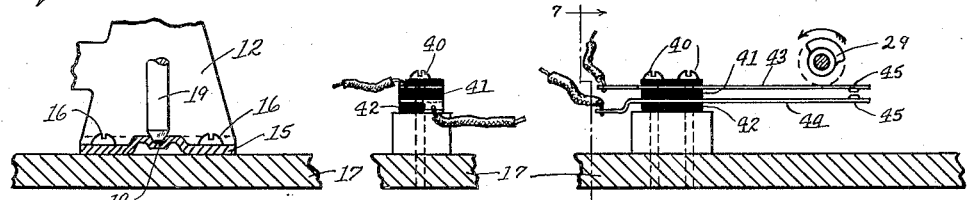
Figure 5 is a sectional view on line 5—5 of Figure 1.
Figure 6 is a sectional view on line 6—6 of Figure 1.
Figure 7 is a sectional view on line 7—7 of Figure 6.

The driving shaft 25 may if desired likewise be provided with a self-starting mechanism comprising a starter disc 48 fixed thereto, below which is a bar 49 provided with a pair of spaced longitudinal slots 50, 51 through which pass pins 52, 53 set into the base 17 permitting the bar to slide longitudinally. The opposite ends of the slidable bar are provided with reversely turned flanged ends 54, 55, the end 54 being a handle or pull. A coil contraction spring 56 is interposed between the end 55 and the bracket 57 for urging the bar in the direction of the arrow. A piece of rough material 58 of suitable character is preferably secured to the upper surface of the bar 49 as best shown in Figure 4 and is adapted to frictionally engage the periphery of the starter disc 48 when the bar 49 is manually drawn outwardly in a direction opposite the direction of the arrow in Figure 4, which bar when released is drawn by the spring and its rough surface 58 engages the starter disc to start the device in operation as now to be described.

In operation, the manually controlled master switch 47 is first closed and the slidable bar 49 is then pulled outwardly and released. The roughened surface 58 of this slidable bar frictionally engages the periphery of the starter disc 48 to start the device in operation.

Since the starter disc 48 is fixed on the driving shaft 25, rotation of the driving shaft causes rotation of the driven shaft 19 through the worm 28 and gear wheel 22. The turntable is thus caused to be rotated.

During this rotation of the driving shaft 25, the cam 29 periodically causes the contact 45 on the flexible finger 43 to engage the contact 46 on the spaced finger 44 and the arm 38 to engage the contact on the under transverse side of the yoke 37 thereby closing the motor circuit. When the circuit is thus closed, the impulse motor is energized which draws the switch arm 36 downwardly. The depending link which is secured to the arm 36 and is pivotally connected with the crank 30 thus causes the drive shaft to rotate whereupon the cycle is repeated.

It will thus be seen that the motor driven turntable herein shown and described is particularly well adapted for use in conjunction with animated display advertising and that the device is sales appealing in use, is an advertising attraction and is economical in operation and in manufacture.

While but one specific embodiment of this invention has been herein shown and described, it will be understood that numerous details of the construction shown may be altered or omitted without departing from the spirit of this invention as defined by the following claims.

We claim:

1. In a driving mechanism for display turntables, the combination with a main shaft for the turntable, of an electric motor included in an energizing circuit; an operating shaft having mounted thereon in axial alignment a contact-closing cam, a worm driving gear, a crank arm, and a starting disc; contacts located in the path of said contact closing cam and contained in the circuit of the electric motor for energizing the latter; a driving gear meshing with said worm gear and connected with said main shaft for the turntable; connections between the electric motor and said crank arm for driving the said operating shaft; and a manually-operated starting-slide projecting exteriorly of the turntable and operating upon said starting disc to start said operating shaft in rotation.

2. The combination set forth in claim 1 wherein the said starting slide is normally disengaged from said starting disc, but is actuated by spring propulsion to frictionally engage the starting disc for starting the operating shaft in rotation.

HENRY P. NORDMARK.
DONALD R. BAKER.